United States Patent Office 3,072,670
Patented Jan. 8, 1963

3,072,670
AMIDES OF SUBSTITUTED 4-THIAZOLIDINONES AND PROCESS THEREFOR
Gerhard Satzinger, Memmingen, Allgau, Germany, assignor to Warner-Lambert Pharmaceutical Company, Morris Plains, N.J., a corporation of Delaware
No Drawing. Filed Mar. 6, 1961, Ser. No. 93,319
5 Claims. (Cl. 260—306.7)

The present invention relates to new and novel compounds of the formula

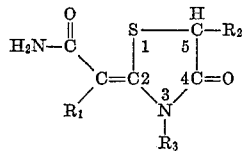

wherein $R_1$ is hydrogen, lower alkyl or aryl, $R_2$ is hydrogen or lower alkyl, and $R_3$ is lower alkyl, and to a method of producing such compounds.

The term "lower alkyl" as used in the specification and in the claims refers to branched and straight chain aliphatic groups having 1 to 6 carbon atoms.

The compounds of this invention have interesting pharmacological activity as analgesics and sedatives. In use, they may be formulated with conventional pharmaceutical carriers to form such typical dosage units as tablets, capsules, solutions, suspensions, suppositories and the like.

It has now been found that the new and novel compounds of this invention may be prepared by the reaction of a compound of the formula

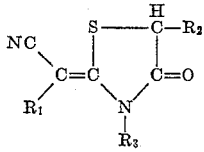

wherein $R_1$, $R_2$ and $R_3$ are as described herein above with a concentrated mineral acid, for example hydrochloric acid, sulfuric acid and the like, at a temperature of about 10° C. to 40° C. The reaction time is normally about 1 to about 3 days. The product at the conclusion of the reaction is recovered by pouring the reaction mixture onto ice and the resulting precipitate is purified by crystallization.

The starting materials of the formula

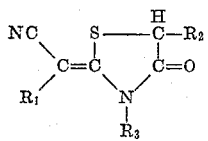

may be prepared by the following reaction sequence:
First, a substituted 4-thiazolidinone of the formula

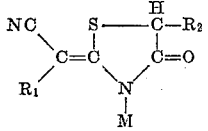

wherein M is an alkali metal is prepared by the reaction of a dinitrile of the formula

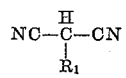

with a mercapto ester of the formula

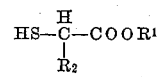

wherein $R^1$ is lower alkyl, in the presence of an aliphatic alcohol having 1 to 6 carbon atoms and an alkali metal, as described in my application entitled "Substituted 4-Thiazolidinones and Process Therefor" (Case A), filed concurrently herewith now copending application Serial No. 93,301 filed March 6, 1961.

The starting materials for use in the preparation of the compounds of this invention are then prepared from these substituted 4-thiazolidinones as follows:

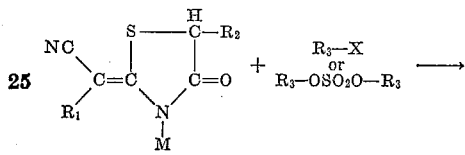

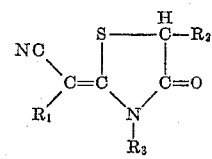

wherein X is halogen, as described in my application entitled "Substituted 4-Thiazolidinones and Process Therefor" (Case B), filed concurrently herewith now copending application Serial No. 93,318 filed March 6, 1961.

The following example is included in order further to illustrate the present invention:

EXAMPLE

*2-Carbamoylmethylene-3-Methyl-4-Thiazolidinone*

15.4 g. (0.1 mole) 2-cyanomethylene-3-methyl-4-thiazolidinone is dissolved in 80 ml. concentrated sulfuric acid and the solution is allowed to stand in an open flask at 25° C. for 48 hours. The mixture is then poured onto ice, the crystals recovered by filtration, washed with water and crystallized from 60% ethanol to yield 15 g. (88%) of 2-carbamoylmethylene-3-methyl-4-thiozolidinone as colorless crystals, melting point 187–189° C.

*Analysis.*—Calc.: C, 41.85; H, 4.69; N, 16.27; S, 18.62. Found: C, 41.82; H, 4.68; N, 16.16; S, 18.34.

By a simliar procedure, other amides of substituted 4-thiazolidinones may be prepared, for example 2-(α-carbamoylbenzylidene)-3-methyl-4-thiazolidinone, 2 - (α-carbamoylethylidene)-3-methyl-5-methyl - 4 - thiazolidinone, 2 - (α-carbamoylpropylidene)-3-ethyl-4-thiozolidinone, 2-carbamoylmethylene - 3 - methyl-5-propyl-4-thiazolidinone, and the like.

It is understood that the foregoing detailed description is given merely by way of illustration and that many variations may be made therein without departing from the spirit of my invention.

Having described my invention, what I desire to secure by Letters Patent is:

1. A compound of the formula

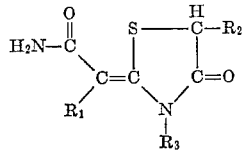

wherein $R_1$ is a member selected from the group consisting of hydrogen, phenyl and lower alkyl, $R_2$ is a member selected from the group consisting of hydrogen and lower alkyl, and $R_3$ is lower alkyl.

2. 2-carbamoylmethylene-3-methyl-4-thiazolidinone.

3. A method of preparing compounds of the formula

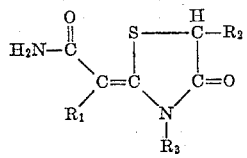

wherein $R_1$ is a member selected from the group consisting of hydrogen, aryl and lower alkyl, $R_2$ is a member selected from the group consisting of hydrogen and lower alkyl, and $R_3$ is lower alkyl, which comprises hydrolyzing the cyano group of a compound of the formula

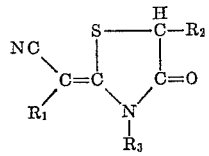

with an acid at a temperature of about 10° C. to about 40° C.

4. A method according to claim 3 wherein said hydrolysis is effected with concentrated sulfuric acid.

5. A method of preparing 2-carbamoylmethylene-3-methyl-4-thiazolidinone which comprises treating 2-cyanomethylene-3-methyl-4-thiazolidinone with concentrated sulfuric acid at a temperature of about 25° C.

References Cited in the file of this patent
UNITED STATES PATENTS

| | | |
|---|---|---|
| 2,743,278 | Knott | Apr. 24, 1956 |
| 2,934,540 | Sheehan | Apr. 26, 1960 |